United States Patent
Tenca et al.

(10) Patent No.: US 9,912,151 B2
(45) Date of Patent: Mar. 6, 2018

(54) DIRECT CURRENT POWER SYSTEM

(71) Applicant: GENERAL ELECTRIC COMPANY, Schenectady, NY (US)

(72) Inventors: Pierluigi Tenca, Munich (DE); Christof Martin Sihler, Karlsruhe (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 511 days.

(21) Appl. No.: 14/603,843

(22) Filed: Jan. 23, 2015

(65) Prior Publication Data

US 2016/0218512 A1    Jul. 28, 2016

(51) Int. Cl.
| | | |
|---|---|---|
| H02J 1/10 | (2006.01) | |
| H02J 1/12 | (2006.01) | |
| H02J 3/36 | (2006.01) | |
| H02J 1/06 | (2006.01) | |
| H02J 1/08 | (2006.01) | |

(52) U.S. Cl.
CPC .............. *H02J 1/10* (2013.01); *H02J 1/06* (2013.01); *H02J 1/08* (2013.01); *H02J 1/108* (2013.01); *H02J 1/12* (2013.01); *H02J 3/36* (2013.01); *Y02E 60/60* (2013.01)

(58) Field of Classification Search
CPC ..... H02J 1/10; H02J 3/36; H02J 1/108; Y02E 60/60
See application file for complete search history.

(56) References Cited

U.S. PATENT DOCUMENTS

| | | |
|---|---|---|
| 4,331,994 A | 5/1982 | Wirth |
| 4,866,586 A | 9/1989 | Suko |
| 5,179,510 A | 1/1993 | Tokiwa et al. |
| 5,550,410 A | 8/1996 | Titus |
| 6,909,620 B2 | 6/2005 | Park et al. |
| 7,218,014 B2 * | 5/2007 | Steinke ..................... H02J 3/36 307/84 |
| 7,411,768 B2 | 8/2008 | Sells |

(Continued)

FOREIGN PATENT DOCUMENTS

WO    2013127575    9/2013

OTHER PUBLICATIONS

Shire, "VSC-HVDC based Network Reinforcement", Jun. 2009, M. Sc. Thesis Electrical power Engineering, Delft University of Technology.*

(Continued)

*Primary Examiner* — Ryan Johnson
(74) *Attorney, Agent, or Firm* — Nitin N. Joshi

(57) ABSTRACT

A direct current power system includes a common direct current (DC) bus configured to supply power to a plurality of loads. A plurality of alternating current (AC) to DC converter bridges supply DC power to the common CD bus. Each of the AC to DC converter bridges is connected to the common DC bus by at least one split DC link. The at least one split DC link includes a small capacitor connected across output terminals of the respective AC to DC converter bridge and at least one diode coupled between two terminals of the small capacitor and the large capacitor in a way to block an instantaneous current flow from the common DC bus to the respective AC to DC converter bridge in case of a fault of the AC to DC converter bridge.

18 Claims, 5 Drawing Sheets

(56) References Cited

U.S. PATENT DOCUMENTS

| | | | |
|---|---|---|---|
| 7,851,943 B2 | 12/2010 | Datta et al. | |
| 8,508,281 B2 | 8/2013 | Honea et al. | |
| 2004/0085046 A1* | 5/2004 | Ye | H02M 7/797 322/13 |
| 2011/0215640 A1* | 9/2011 | Donnelly | H02J 1/10 307/21 |
| 2012/0267955 A1* | 10/2012 | Zhan | H02J 1/06 307/31 |
| 2013/0188402 A1 | 7/2013 | Boe | |
| 2013/0342139 A1 | 12/2013 | Shimomugi et al. | |

OTHER PUBLICATIONS

A European Search Report and Opinion issued in connection with corresponding EP Application No. 6152387.3 dated May 31, 2016.

E.S. Najmi et al.,"Z-Source Three-Phase Four-Switch Inverter with DC Link Split Capacitor and Comprehensive Investigation of Z-Source Three-Phase Four-Switch Inverters," IEEE 978-1-4673-0111-4, Power Electronics and Drive Systems Technology (PEDSTC), Feb. 15-16, 2012, pp. 25-31.

Q.C. Zhong et al.,"H∞Control of the Neutral Point in Four-Wire Three-Phase DC-AC Converters," IEEE Transactions on Industrial Electronics, vol. 53, No. 5, Oct. 2006, pp. 1594-1602.

Gi-Taek Kim et al., "DC Link voltage Control of Reduced Switch VSI-PWM Rectifier/Inverter System," IEEE Industrial Electronics, Control and Instrumentation, IECON 97, 23rd International Conference, vol. 2, Nov. 9-14, 1997, pp. 833-838.

\* cited by examiner

US 9,912,151 B2

DIRECT CURRENT POWER SYSTEM

BACKGROUND

The invention relates generally to power transmission and more specifically to a system and method for transmitting direct current electrical power to marine or subsea electrical equipment.

In the last few decades, the field of power conversion has grown tremendously due to its imminent advantages in motor drives, renewable energy systems, high voltage direct current (HVDC) systems, and the like. For example, a subsea oil and gas production system which requires hundreds of megawatts of electric power may employ a HVDC transmission and distribution system for delivery of electric power. Furthermore, in recent time, marine traffic has also increased substantially across the world due to tremendous rise in cargo transport vessels, warships, offshore oil ships, passenger ships etc. These vessels or ships have many electrical loads on board. Variable speed electric drives for pumps, fans, electric propulsion installations, lighting and air conditioning are some examples of the electrical loads on board of a ship.

Often subsea and marine power supply circuit arrangements include a direct current (DC) power system including a DC bus to which a plurality of power converters and a plurality of loads are connected. Power converters supply energy to the plurality of loads via the common DC bus. The common DC bus also includes a plurality of capacitors. Such a power system poses significant protection problems due to a large number of subsystems in the circuit. The protection problems are exacerbated by the subsea environment and the customer requests of system availability for several years without maintenance. It is therefore necessary to design the overall set of subsystems connected to the common DC bus in a way that limits the damages when even just one of the subsystem fails because of a short-circuit fault. The main problem is discharge of large quantity of energy accumulated in the capacitors that are connected to the common DC bus.

Utilizing DC circuit breakers for interrupting the DC fault current is one of the solutions for the above protection problem. Another solution is to use overdesigned subsystems so that they can withstand the energy discharged by the capacitors during the fault. However, these solutions involve costly and bulky components which further involve problems such as space constraints.

Therefore, there still exists a need for a compact and a reliable system for transmitting electric power to subsea or marine equipment.

BRIEF DESCRIPTION

In accordance with an embodiment of the present technique, a direct current power system is provided. The DC power system includes a common DC bus including at least a positive rail configured to supply power to a plurality of loads. The DC power system further includes a plurality of alternating current (AC) to DC converter bridges supplying DC power to the common DC bus, wherein each of the AC to DC converter bridges is connected to the common DC bus by at least one split DC link. The split DC link includes a small capacitor connected across output terminals of the respective AC to DC converter bridge and a large capacitor connected across the DC link. The split DC link further includes at least one diode coupled between two terminals of the small capacitor and the large capacitor in a way to block an instantaneous current flow from the common DC bus to the respective AC to DC converter bridge in case of a fault of the AC to DC converter bridge.

In accordance with another embodiment of the present technique, a method of supplying DC power is provided. The method includes providing DC power to a plurality of loads via a common DC bus and connecting a plurality of alternating (AC) to DC converter bridges to the common DC bus by providing a split DC link between each of the AC to DC converter bridges and the common DC bus. In the method, providing the split DC link includes connecting a small capacitor across output terminals of respective AC to DC converter bridge and connecting a large capacitor across the DC link. Providing the split DC link further includes coupling at least one diode between two terminals of the small capacitor and the large capacitor in a way to block an instantaneous current flow from the common DC bus to the respective AC to DC converter bridge in case of a fault of the AC to DC converter bridge.

DRAWINGS

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. Furthermore, the terms "circuit" and "circuitry" and "controller" may include either a single component or a plurality of components, which are either active and/or passive and are connected or otherwise coupled together to provide the described function.

Figure 1:
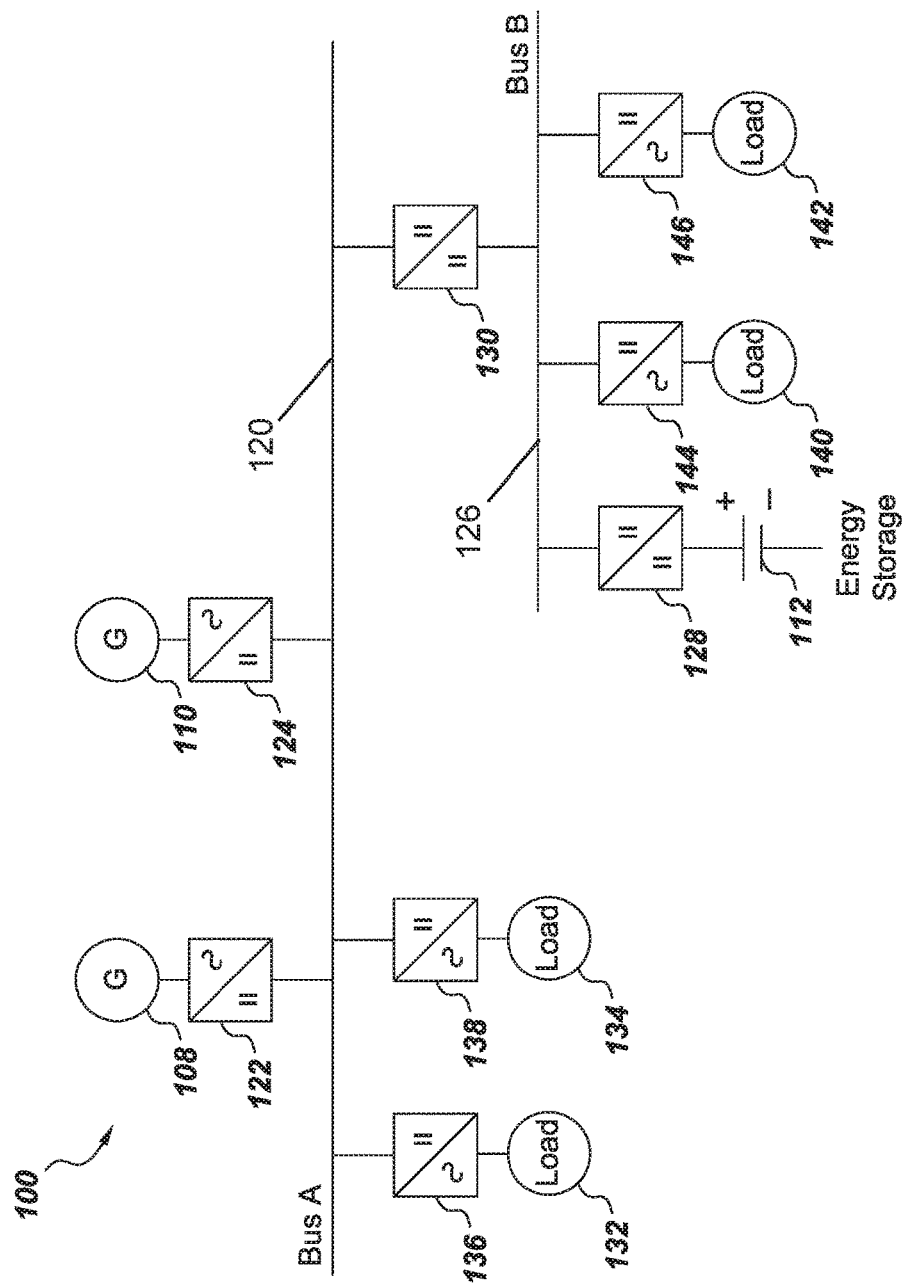
FIG. 1 is a diagrammatical representation of a prior art DC power system for a marine or subsea equipment.

Turning now to the drawings, by way of example in FIG. 1, a prior art DC power system 100 for a marine or subsea equipment is depicted. DC power system 100 includes energy sources such as alternating current (AC) generators 108, 110 which feed power to a DC bus 120 via power electronic converters 122 and 124 respectively. In one embodiment, for example for a subsea system, DC power system 100 may receive energy from a power grid (not shown) via a transmission line (not shown). In the embodiment shown DC power system 100 also includes an energy storage device 112 which feeds power to a DC bus 126 via a power electronic converter 128. Power electronic converters 122, 124 are AC to DC converters as they have to convert power from AC generators to the DC bus whereas power electronic converter 128 is a DC to DC converter as it couples a DC energy storages device to a DC bus. The two DC buses 120 and 126 do not have same DC voltage and hence are coupled to each other via a DC to DC converter 130. DC to DC converter 130 may be a bidirectional DC to DC converter or an unidirectional DC to DC converter. Further, loads 132 and 134 are connected to DC bus 120 via power electronic converters 136 and 138 respectively and loads 140 and 142 are connected to DC bus 122 via power electronic converters 144 and 146 respectively. Depending on whether the load is an AC load or a DC load, power electronic converter 136, 138, 144 and 146 may be AC to DC converters or DC to DC converters. DC power system 100 may also include a controller (not shown) to control various DC to DC converters.

Figure 2:
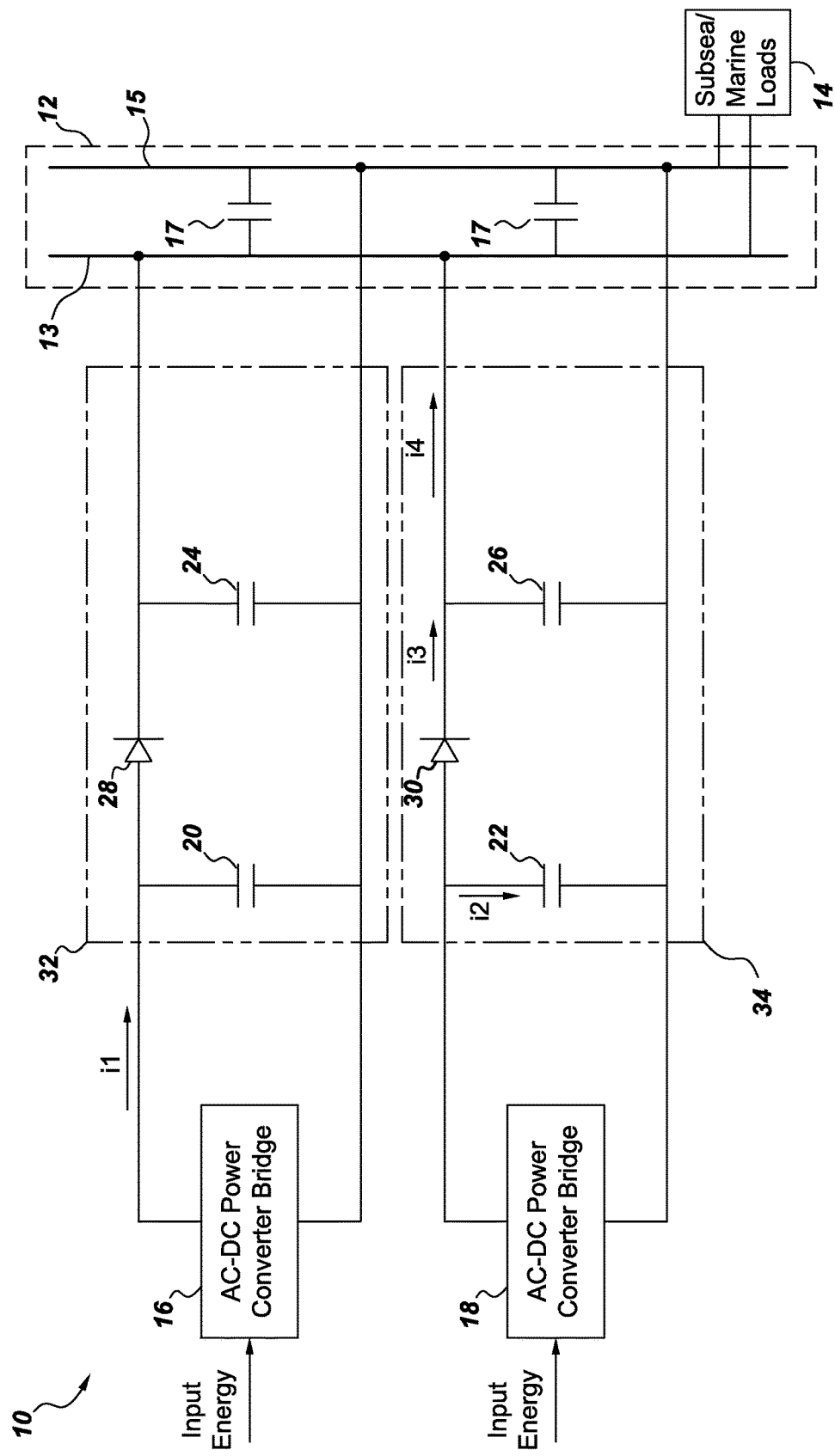
FIG. 2 is a schematic diagram illustrating a DC power system, according to aspects of the present disclosure.

FIG. 2 illustrates a schematic diagram of a DC power system 10 in accordance with aspects of the present disclosure. The DC power system 10 includes a DC bus 12 to which a plurality of loads 14 are connected. DC bus 12 includes a positive rail 13 and a negative rail 15 to which a plurality of DC capacitors 17 may be connected. It should be noted that in some embodiments, the negative rail may be replaced with a ground rail. As discussed earlier, the DC bus 12 may receive energy from energy sources such as local generators, batteries or a power grid, for example. Power grid and local generators are generally alternating current (AC) energy sources although DC generators may also be used. Therefore, system 10 further includes a plurality of AC to DC power converter bridges 16, 18. The power converter bridges 16, 18 may be single phase bridges or three phase bridges, for example. When AC to DC power converter bridges 16 and 18 are single phase bridges, they include two converter legs whereas when the AC to DC power converter bridges are three phase bridges, they include three converter legs.

Figure 3:
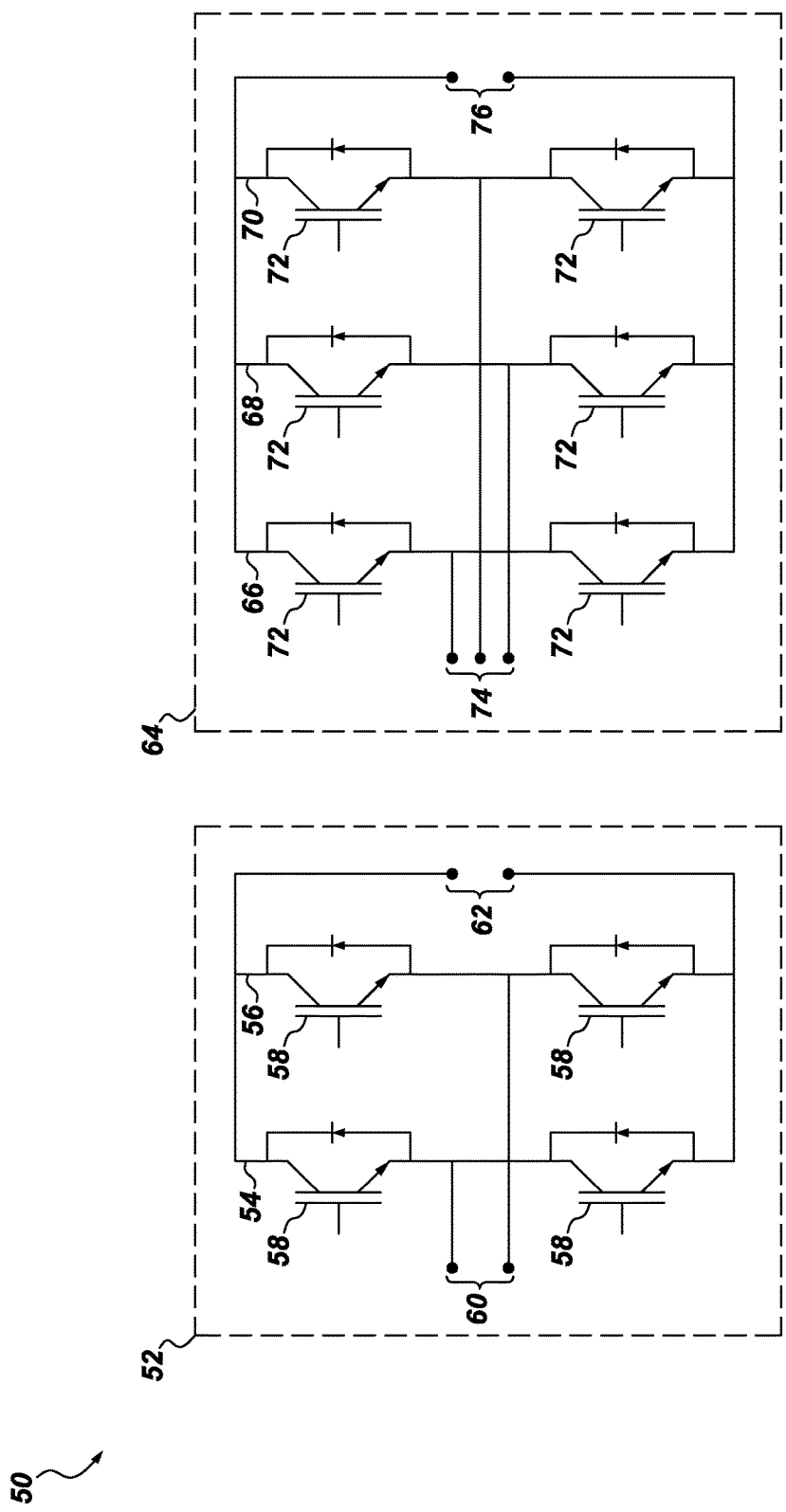
FIG. 3 is a schematic diagram illustrating AC to DC power converter bridges of FIG. 2, according to aspects of the present disclosure.

FIG. 3 shows a schematic diagram 50 of examples of the AC to DC power converter bridge 16 or 18 in accordance with an embodiment of the present technique. An AC to DC power converter bridge 52 is an example of a single phase AC to DC power converter bridge and includes two legs 54 and 56. Each of the legs includes plurality of controllable semiconductor switches 58. An input AC supply may be provided to AC to DC power converter bridge 52 at terminals 60 and an output DC supply may be taken at terminals 62.

An AC to DC power converter bridge 64 is an example of a three phase AC to DC power converter and includes three legs 66, 68 and 70. Each of the legs includes plurality of controllable semiconductor switches 72. An input AC supply may be provided to AC to DC power converter bridge 64 at terminals 74 and an output DC supply may be taken at terminals 76.

In both converter bridges 52 and 64, the controllable semiconductor switches 58 and 72 are switched on and off at a switching frequency and thus, they convert AC power into DC power. It should be noted that converter bridges 52 and 64 are only two examples of AC to DC converter bridges 16 or 18. In other embodiments, AC to DC converter bridges 16 or 18 may include other structures, such as a multilevel converter bridge or simply a diode bridge.

Referring back to FIG. 2, AC-DC power converter bridges 16, 18 are connected to the common DC bus 12 via at split DC links 32 and 34. Split DC links 32, 34 include small capacitors 20, 22 which are connected at the output terminals of AC to DC power converter bridges 16, 18 respectively. Furthermore, split DC link 32, 34 include large capacitors 24, 26 which are connected across the common DC link 12. The large capacitors 24, 26 are coupled to AC to DC power converter bridges via uncontrolled semiconductor switches such as diodes 28, 30 respectively. In other words, DC links of AC to DC power converter bridges 20, 22 are split into small capacitors 20, 22 and large capacitors 24, 26. Further, the small and large capacitors 20, 22 and 24, 26 are separated by diodes 28, 30. Large capacitors 24, 26 are connected in parallel to DC bus 12. Diodes 28, 30 allows current to be flown from AC to DC power converter bridges 16, 18 to DC bus 12. However, they block reversal of current i.e., a current flow from DC bus 12 to power converter bridges 16, 18 is blocked by diodes 28, 30. In the embodiment shown, diodes 28, 30 are connected such that their anodes are connected to AC to DC power converter bridges 16, 18 and their cathodes are connected to DC bus 12.

In case of a short circuit fault on AC to DC power converter bridge 16, diode 28 blocks reversal of power flow from DC bus 12 to converter bridge 16. This results in two things 1) a damage to AC to DC power converter bridge 16 due to dumping of energy from DC bus 12 into converter bridge 16 is avoided; and 2) AC to DC power converter bridge 16 is isolated from DC bus 12, resulting in continuity of operation of rest of the system. The diode 28 facilitates isolation of the DC power converter bridge 16 from DC bus 12 without any controllable switching device. Similarly, in case of a short circuit fault on AC to DC power converter bridge 18, diode 30 isolates power converter bridge 18 from DC bus 12. It should be noted that only two AC to DC converters are shown in FIG. 2 for ease of explanation. However, a number of AC to DC converter bridges may be coupled to DC bus 12 and for every such AC to DC converter bridge a split DC link and a diode may be employed to isolate the bridge from DC bus 12. The diodes 28, 30 then block an instantaneous current flow from the common DC bus 12 to the AC to DC converter bridges 16, 18 in case of a fault of the respective AC to DC converter bridge.

Small capacitors 20, 22 facilitate a negative DC current in case of a fault on the converter bridges 16, 18 and thus, capacitors 20, 22 protect converter bridges 16, 18 from extreme voltage decay at output terminals. Small capacitors 20, 22 are mounted very close the phase legs of converter bridges 16, 18, and by allowing the negative current flow, they continue to assure that each converter bridge 16, 18 observes a linear voltage source formed by small capacitors 20, 22 for limited time intervals. The average power flow between converter bridges 16, 18 and DC bus 12 has only one sign i.e., the average power is transferred from the converter bridges 16, 19 to the common DC-bus 12. In other words, the average values of the currents from the phase legs of converter bridges 16, 18 are compatible with the polarity of diodes 28 and 30 and this means that the currents from the phase legs of converter bridges flow into diodes 28 and 30 for the majority of the period, thereby connecting the much larger capacitors 24 and 26 to small capacitors 20 and 22. For most of the period, when diodes 28 and 30 conduct, the DC bus 12 behaves as the usual approximation of a linear voltage source. It is only when the currents from the phase legs of converter bridges 16, 18 are negative that diodes 28 and 30 open and then small capacitors 20 and 22 allow such currents. In case of the fault on one of the converter bridge 16 or 18, small capacitor 20 or 22 abruptly discharge energy into respective converter bridge 16 or 18 but the energy is very limited because of small capacitance value, greatly reducing the demands on the explosion proof of overall system. Additionally, the faulty converter bridge 16 or 18 is automatically isolated from the others and from the DC-bus by the diodes 28 or 30. As a consequence, the system continues to operate with minor perturbation.

As discussed earlier, capacitance values of small capacitors 20, 22 are selected so as to allow just sufficient flow of normal mode instantaneous current in the converter bridges 16, 18 without extreme voltage decay at output terminals of converter bridges 16, 18. The normal mode instantaneous current here refers to the instantaneous current during the normal operation of the power converter bridges 16, 18 flowing between converter bridges 16, 18 and small capacitors 20, 22. In one embodiment, the ratio of capacitance values of large capacitors 24, 26 to capacitance values of small capacitors 20, 22 is more than 10.

Figure 4:
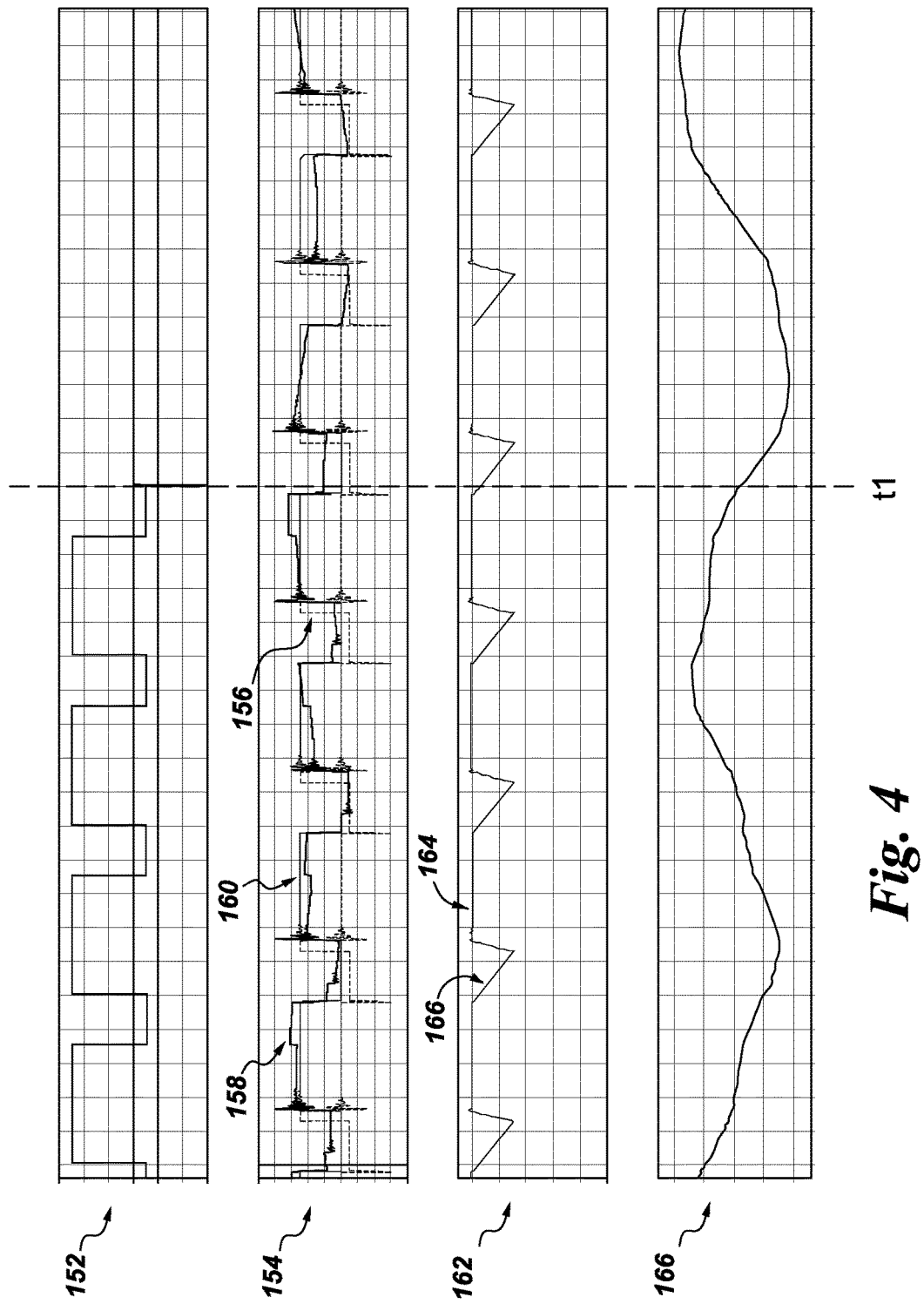
FIG. 4 is a graphical diagram illustrating simulation plots of the subsea power transmission/distribution system of FIG. 2 in accordance with an embodiment of the present technique.

Referring now to FIG. 4, a graphical diagram 150 illustrating simulation plots of the DC power system of FIG. 2 in accordance with an embodiment of the present technique is depicted. The plots shown are for a simulated short circuit fault on AC to DC converter bridge 16 at time t1. In FIG. 4, plot 152 shows a current i1 (FIG. 2) flowing before small capacitor 20. As can be seen current i1 is positive for most of the time and it is negative for very less period. Therefore, average value of current i1 is positive. Furthermore, at time t1, when the short circuit fault occurs, there is a negative spike in current i1. However, the current spike is very limited because of low value of capacitor 20. The capacitor 20 discharges completely within a moment of time and thereafter current i1 becomes zero as shown in plot 152.

Furthermore, plot 154 in FIG. 4 shows various currents related to healthy AC to DC converter 18. Plot 154 shows a current signal 156 which represents a current i2 in small capacitor 22; a current signal 158 which represents a current i3 after the diode 30; and a current signal 160 which represents a current i4 after the large capacitor 26. As can be seen even after the fault at time t1 in AC to DC converter 16, AC to DC converter 18 operates normally without major disturbance.

Plot 162 in FIG. 4 shows, a voltage signal 164 representing a voltage of DC bus 12 and a voltage signal 166 representing a voltage across small capacitor 22. As can be seen DC bus voltage 166 continues to remain constant even after fault at time t1. Similarly, there is not a significant difference to voltage 166 of small capacitor 22. Furthermore, plot 166 shows a voltage ripple in the voltage of DC bus 12 which also does not have significant variation after fault at time t1. In general, the present technique facilitates continuity of operation of DC power system without any major disturbance even after a short circuit fault at one of the AC to DC converters.

Figure 5:
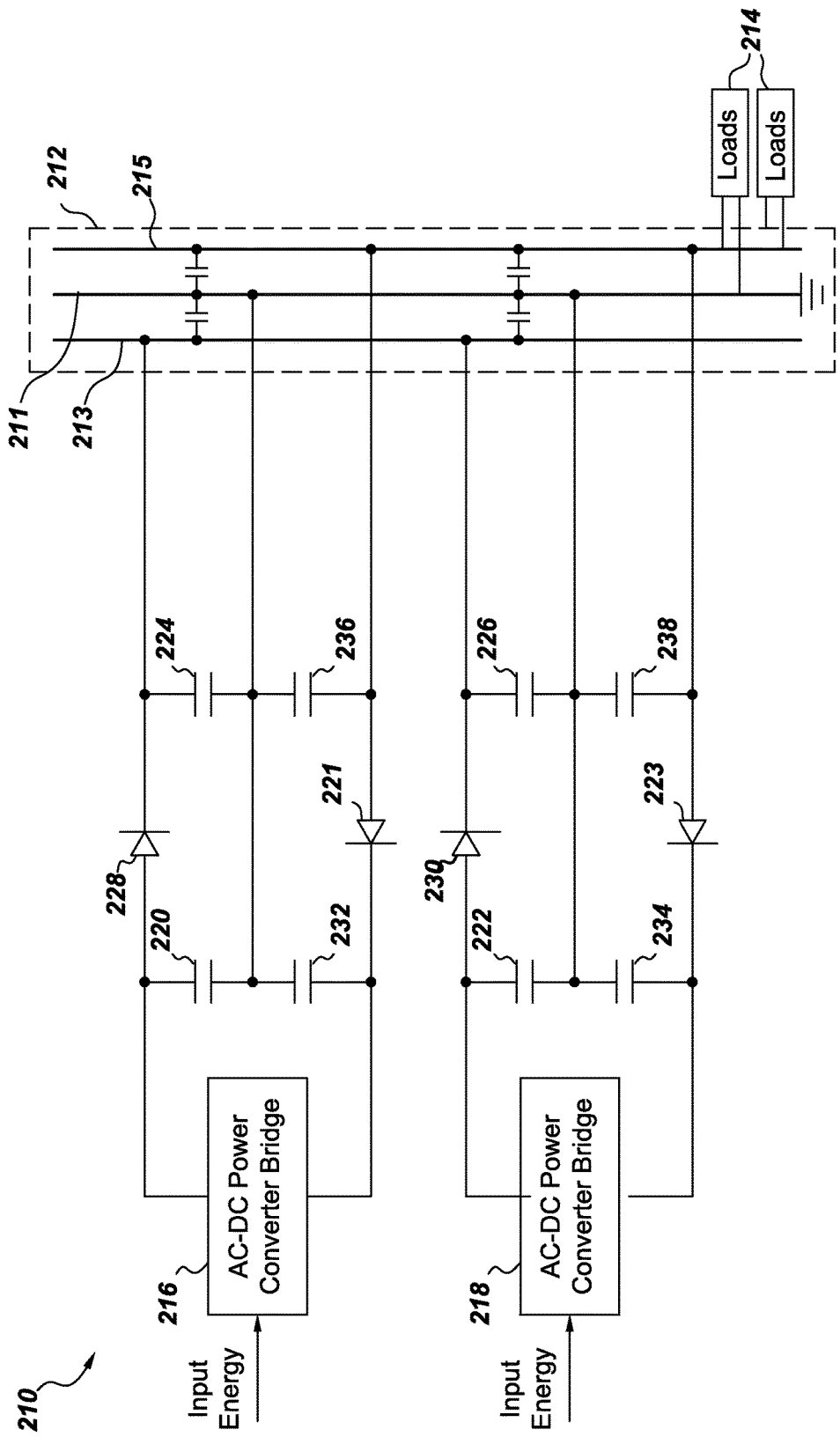
FIG. 5 is a schematic diagram illustrating another DC power system, according to aspects of the present disclosure.

FIG. 5 illustrates a schematic diagram of another DC power system 210 in accordance with aspects of the present disclosure. The DC power system 210 includes a DC bus 212 to which a plurality of loads 214 are connected. DC bus 212 includes a positive rail 213, a negative rail 215, and a ground rail 211. The ground rail potential is in between the positive rail and the negative rail potential. Some loads may be connected between the positive and the ground rail whereas some loads may be connected between the ground and the negative rail. Furthermore, some loads may also be connected between the positive rail and the negative rail. DC power system 210 further includes a plurality of AC to DC power converter bridges 216, 218.

FIG. 5 also includes small capacitors 220, 232, 222, 234 and large capacitors 224, 236, 226 and 238 as in FIG. 2. It should be noted that although, the capacitors are shown to be connected between the ground rail and the positive or negative rail, in other embodiments, the capacitors may be connected directly between the positive rail and the negative rail. As in the embodiment of FIG. 2, the large capacitors 224, 236, 226, 238 are connected to AC to DC power converter bridges 216, 218 via uncontrolled semiconductor switches such as diodes 228, 230 respectively. However, unlike embodiment of FIG. 2, large capacitors 224, 236, 226, 238 are also connected to AC to DC power converter bridges 216, 218 via reverse connected diodes 221 and 223 as shown in FIG. 5. Since in FIG. 5, the loads are connected between various rails, e.g., the ground rail and the negative rail or the ground rail and the positive rail, a current may flow between the DC bus 212 to AC to DC power converter bridges 216, 218 via either the negative rail or the positive rail. Thus, in such cases, reverse connected diodes 221, 223 block discharge of current from DC bus 212 to AC to DC power converter bridges 216, 218 and forward connected diodes 228, 230 block discharge of current AC to DC power converter bridges 216, 218 to DC bus 212 during a fault. Therefore, DC bus 212 is completely isolated from AC to DC power converter bridges 216, 218.

One of the advantages of the present system is high system availability via a more fault tolerant conversion structure based on splitting of the DC link of power converters. The system minimizes components and creates isolation between a common DC bus and faulty power converter. Another advantage of the system is that it limits damages to faulty power converters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A direct current power system comprising:
   a common direct current (DC) bus including at least a positive rail configured to supply power to a plurality of loads;
   a plurality of alternating current (AC) to DC converter bridges supplying DC power to the common DC bus, wherein each of the AC to DC converter bridges is connected to the common DC bus by at least one split DC link;
   wherein the at least one split DC link includes:
      a first capacitor connected across output terminals of the respective AC to DC converter bridge;
      a second capacitor connected across the DC link; and
      at least one diode coupled between two terminals of the first capacitor and the second capacitor in a way to block an instantaneous current flow from the common DC bus to the respective AC to DC converter bridge in case of a fault of the AC to DC converter bridge;
   wherein at least one second diode is connected between other two terminals of the first capacitor and the second capacitor.

2. The DC power system of claim 1, wherein the plurality of loads include marine or subsea equipment.

3. The DC power system of claim 1, wherein a capacitance value of the second capacitor is more than 10 times a capacitance value of the first capacitor.

4. The DC power system of claim 1, wherein a capacitance value of the first capacitor is selected so as to allow just sufficient flow of a normal mode instantaneous current in the respective AC to DC converter bridge without extreme voltage decay at output terminals of the AC to DC converter bridge during normal operation of the AC to DC converter bridge.

5. The DC power system of claim 1, wherein the DC bus further includes a ground rail or a negative rail or both.

6. The DC power system of claim 5, wherein a plurality of DC capacitors are connected between the positive rail and the negative rail or between the positive rail and the ground rail or between the negative rail and the ground rail.

7. The DC power system of claim 5, wherein a plurality of loads are connected between the positive rail and the negative rail or between the positive rail and the ground rail or between the negative rail and the ground rail.

8. The DC power system of claim 1, wherein each of the AC to DC converter bridges includes a single phase converter bridge or a three phase converter bridge.

9. The DC power system of claim 8, wherein the single phase converter bridge includes two phase legs and the three phase converter bridge includes three phase legs.

10. The DC power system of claim 1, wherein each of the AC to DC power converter bridge receives input energy from an AC generator or a power grid.

11. A method of supplying direct current (DC) power comprising:
providing DC power to a plurality of loads via a common DC bus;
connecting a plurality of alternating (AC) to DC converter bridges to the common DC bus by providing a split DC link between each of the AC to DC converter bridges and the common DC bus;
wherein providing the split DC link includes:
connecting a first capacitor across output terminals of respective AC to DC converter bridge;
connecting a second capacitor across the DC link; and
coupling at least one diode between two terminals of the first capacitor and the second capacitor in a way to block an instantaneous current flow from the common DC bus to the respective AC to DC converter bridge in case of a fault of the AC to DC converter bridge;
wherein providing the split DC link comprises connecting at least one second diode between other two terminals of the first capacitor and the second capacitor.

12. The method of claim 11, wherein providing DC power to a plurality of loads comprises receiving AC energy from AC generators or a power grid at each of the AC to DC power converter bridge.

13. The method of claim 11, wherein connecting the first capacitor and the second capacitor comprises selecting a capacitance value of the second capacitor to be more than 10 times a capacitance value of the first capacitor.

14. The method of claim 11, wherein connecting the first capacitor and the second capacitor comprises selecting a capacitance value of the first capacitor so as to allow just sufficient flow of a normal mode instantaneous current in the respective AC to DC converter bridge without extreme voltage decay at output terminals of the AC to DC converter bridge during normal operation of the AC to DC converter bridge.

15. The method of claim 11, wherein providing DC power to the plurality of loads comprises providing a positive rail in the common DC bus.

16. The method of claim 11 further comprising providing a negative rail or a ground rail or both in the common DC bus.

17. The method of claim 11, wherein providing DC power to a plurality of loads comprises coupling a plurality of DC capacitors between the positive rail and the negative rail or between the positive rail and the ground rail or between the negative rail and the ground rail of the DC bus.

18. The method of claim 17, wherein providing DC power to the plurality of loads comprises connecting the plurality of loads between the positive rail and the negative rail or between the positive rail and the ground rail or between the negative rail and the ground rail.

* * * * *